Figure 1:
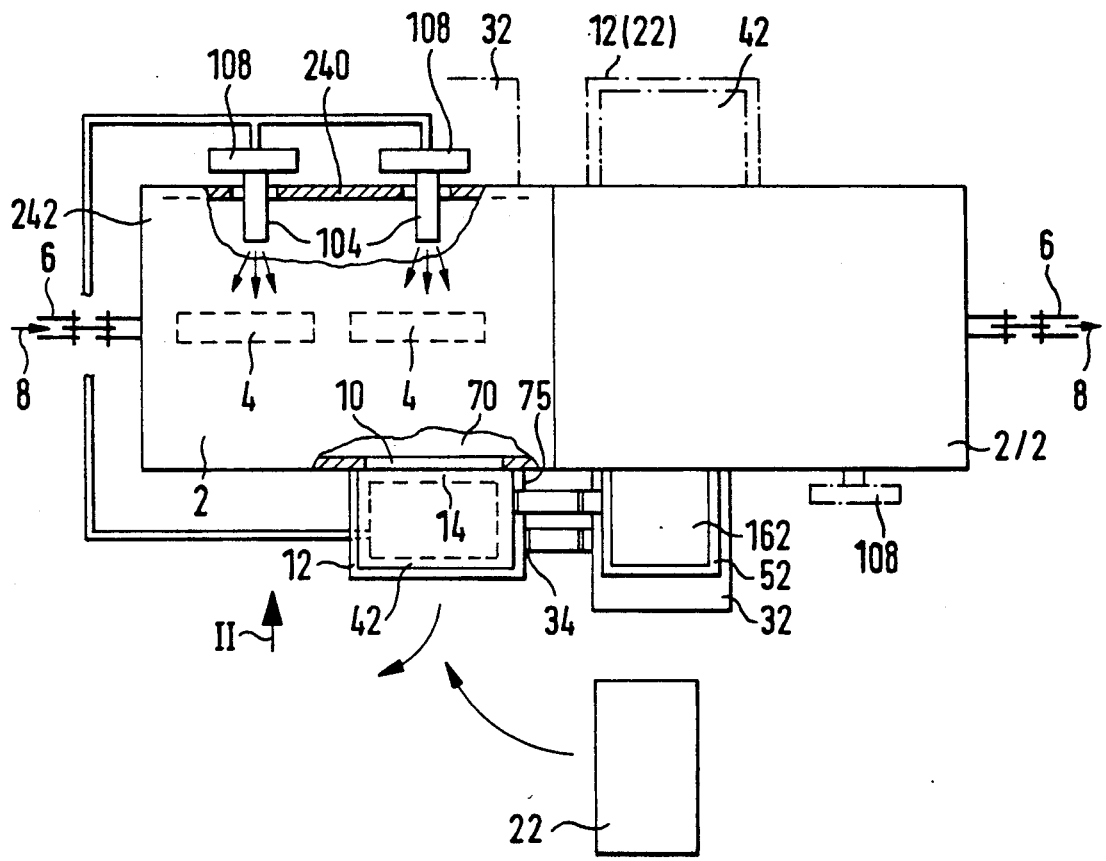

United States Patent [19]
Gelain et al.

[11] Patent Number: 5,256,201
[45] Date of Patent: Oct. 26, 1993

[54] POWDER SPRAY COATING SYSTEM

[75] Inventors: Silvano Gelain, Abtwil; Bernhard Dinkel, St. Gallen; Markus Beerli, Gossau, all of Switzerland

[73] Assignee: Gema Volstatic AG, St. Gallen, Switzerland

[21] Appl. No.: 960,633

[22] Filed: Oct. 14, 1992

[30] Foreign Application Priority Data

Oct. 21, 1991 [DE] Fed. Rep. of Germany ....... 4134701

[51] Int. Cl.$^5$ ..................... B05C 19/00; B01D 46/36
[52] U.S. Cl. .................................. 118/326; 118/308; 118/309; 118/621; 118/634
[58] Field of Search ............... 118/308, 309, 310, 314, 118/326, 620, 621, 626, 630, 501, 634

[56] References Cited

U.S. PATENT DOCUMENTS

| | | | |
|---|---|---|---|
| 4,409,009 | 10/1983 | Lissy | 118/326 X |
| 4,590,884 | 5/1986 | Kreeger et al. | 118/326 X |
| 4,823,731 | 4/1989 | Howeth | 118/326 |
| 4,898,116 | 2/1990 | Kozoe et al. | 118/621 |
| 5,078,084 | 1/1992 | Shutic et al. | 118/326 X |

Primary Examiner—David A. Simmons
Assistant Examiner—James J. Engel, Jr.
Attorney, Agent, or Firm—Schwartz & Weinrieb

[57] ABSTRACT

A filter unit (12) or a cyclone unit (22) can alternately be attached to a cabin (2) to draw powder out of the cabin. The units move on wheels. In an operating position adjacent to the cabin (2), they are automatically aligned with flow connections and can be connected. A common fan (52) for both units is connected with the filter unit (12) via a compressed air cleaning device (42) in terms of flow, if the former is in the operating position, and at the same time it closes off the inlet to a post-filter unit (32), while when the filter unit (12) is removed and the cyclone unit (22) is in the operating position, this cyclone unit (22) is connected with the fan (52) via the post-filter (32), and the cyclone unit (22) closes off a flow inlet of the compressed air cleaning unit (42). In this way, color changes can be carried out in a short period of time, and good exhaust cleaning is achieved by the filter unit (12) during extended operation with the same color, without a color change.

14 Claims, 7 Drawing Sheets

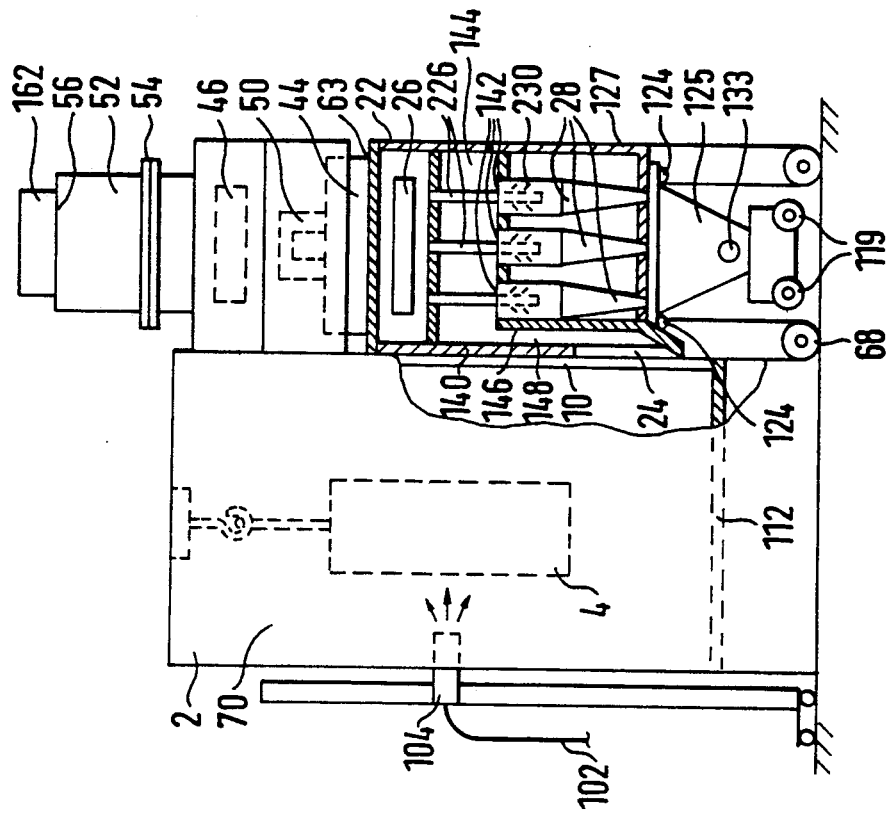

POWDER SPRAY COATING SYSTEM

The invention relates to a powder spray coating system.

A powder spray coating system is known from EP 0 044 310 B1, in which a powder unit is arranged at a cabin opening, which unit can be removed from the cabin as a whole and contains all the parts which directly affect the powder circulation: a powder container, a screening and treatment device for the powder, and a powder pump for feeding powder out of the powder container to a spray device. The powder unit is mounted on wheels. It contains candle-shaped filter elements, which are connected to a compressed air cleaning device at their upper end, which can give off compressed air bursts into the filter elements at intervals, in order to blow powder off the filter elements. The powder unit is connected with a suction blower at its upper end, in terms of flow, which blower is arranged on the cabin and drives the air drawn through the filter elements through a post-filter. On the side of the cabin facing away from the powder unit, a spray gun is arranged, which gun is directed against the filter elements and sprays objects with powder, which objects are transported through the cabin perpendicular to the direction between the spray gun and the filter elements. The cabin floor conveys any excess powder which falls onto it laterally away into the powder unit, in which the powder falls below the filter elements, through a screen, into the powder container. An injector serves as the powder pump to remove the powder from the powder container.

EP 0 100 932 B1 shows a powder spray coating system, in which a plurality of cyclones is integrated into the spray cabin, through which a stream of air and excess powder is drawn from the cabin, where the cyclones separate the essential parts of the powder from the powder/air stream. The air stream pre-cleaned in the cyclones subsequently passes through a filter, by which another portion of the powder is filtered out of the pre-cleaned air stream. Powder separated by the cyclones, and powder dropping from the filters, falls into a powder carriage 8, in which it is treated by a screening machine and air which flows through an air-permeable container bottom. The treated powder is passed back to a spray gun by an injector. Instead of a common powder carriage, a separate powder carriage each can be provided for the cyclone on the one hand, and the filter on the other hand. In addition, fresh powder is fed to the powder carriage, which is mixed with the recycled powder in the powder carriage.

U.S. Pat. No. 4,762,013 shows a lift stand, which carries a plurality of spray devices and can move the spray devices into different positions with automatic control. Using filters, it is possible to clean a mixed stream of powder and air of almost 100% of the powder. If a switch is made from one type of powder to another, particularly during a so-called color change, then the filter elements of the filter have to be carefully cleaned of residue of the powder used previously, before the new powder can be used, because otherwise coating defects can occur. Even the slightest amounts of powder residues of the color used before can result in color defects in the coating of the new color, making it unusable. Powder can also be separated from mixed powder/air streams with cyclones, through which the mixed stream is passed. Cyclones can be cleaned in a significantly shorter time than filter elements. However, cyclones have the disadvantage that they are only suited for pre-cleaning the mixed stream, because they can only separate part of the powder from the mixed stream. Therefore filter elements have to be placed after the cyclones in terms of flow, which clean the pre-cleaned mixed stream completely, before the cleaned mixed stream, which now consists only of air, can be blown out into the surrounding atmosphere. During a color change, only the cyclones are cleaned, not their post-filters. Therefore only the powder separated from the mixed stream by the cyclones can be used for coating objects again, but not the powder separated from the mixed stream by the post-filters. For this reason, filters are only used if coating is only done with one type of powder, or if color changes are not necessary very often. Cyclones are used if very frequent color changes are desired. Instead of a single large cyclone, it is more advantageous to use many small cyclones. Drawing excess powder out of the cabin by suction, with filters or cyclones, serves to reduce the powder concentration in the cabin and to generate a partial vacuum in the cabin. A high powder concentration in the cabin can lead to an explosive powder/air mixture. The partial vacuum in the cabin prevents powder from exiting out of the cabin at undesired points.

With the invention, the task to be accomplished is to structure the powder spray coating system in such a way that even with compact cabins, frequent color changes can take place in economical manner.

This task is accomplished, according to the invention, with the combination of characteristics of claim 1.

With the invention, rapid color changes can be carried out even with small cabins. If coating is done with the same color, i.e. the same powder for an extended period of time, the filter unit is moved into place at an exhaust opening of the cabin. If color changes have to be made frequently, then the cyclone unit is moved into place at the exhaust opening instead of the filter unit. The cyclone unit is a small, light unit, since it consists of a plurality of small cyclones instead of a single large cyclone, and its post-filter is fixed in place separate from it. By means of the flow connections which are fixed in place for the filter unit on the one hand, and the cyclone unit on the other hand, short flow paths are possible and these units themselves can be structured as connection elements, so that no additional longer flow lines are required. The short flow paths reduce the required flow energy, prevent deposits from the powder/air stream, and prevent demixing of the powder (demixing: separation of the powder into regions with larger powder particles and regions with smaller powder particles). The short flow paths and the small flow cross-sections which are possible according to the invention allow the use of suction fans with low output. Furthermore, the invention has the advantage that all elements are structured as units or modules and can be standardized for several different system types. Another advantage of the invention is that even existing, older systems can be subsequently structured according to the invention, in simple and inexpensive manner. A special advantage of the invention is also the possibility that smaller powder containers can be used, particularly powder containers with a smaller diameter, independent of the size of the cabin. This is particularly true for the powder container for the cyclone unit, if the powder separated by the cyclones according to the invention is not caught by the powder container, but rather by a separate catch container. This separate catch container can be structured, according to the invention, in such a way that powder can be conveyed from it into the powder container, even without the necessity of providing a device for fluidization of the powder at the catch container. The powder container provided in addition to the catch container can contain a screening machine with a vibrating screen, and fresh additional powder can also be placed into the powder container. In the latter, it is mixed with the recycled powder and passed to a spray device. The powder container can have the same size for all cabin sizes and for all sizes of cyclone units, in other words be standardized. By means of the use of the catch container, both this catch container and the powder container can be structured to be so small, particularly to have such a small diameter, that no powder demixing takes place and the recycled powder and the fresh powder are mixed together sufficiently well in the powder container. Mixing can be supported by the screening machine. The catch container can be a mobile carriage which can be attached under the cyclones, on the frame of the cyclone unit, for example suspended there.

Additional characteristics of the invention are described in the dependent claims.

Figure 3:
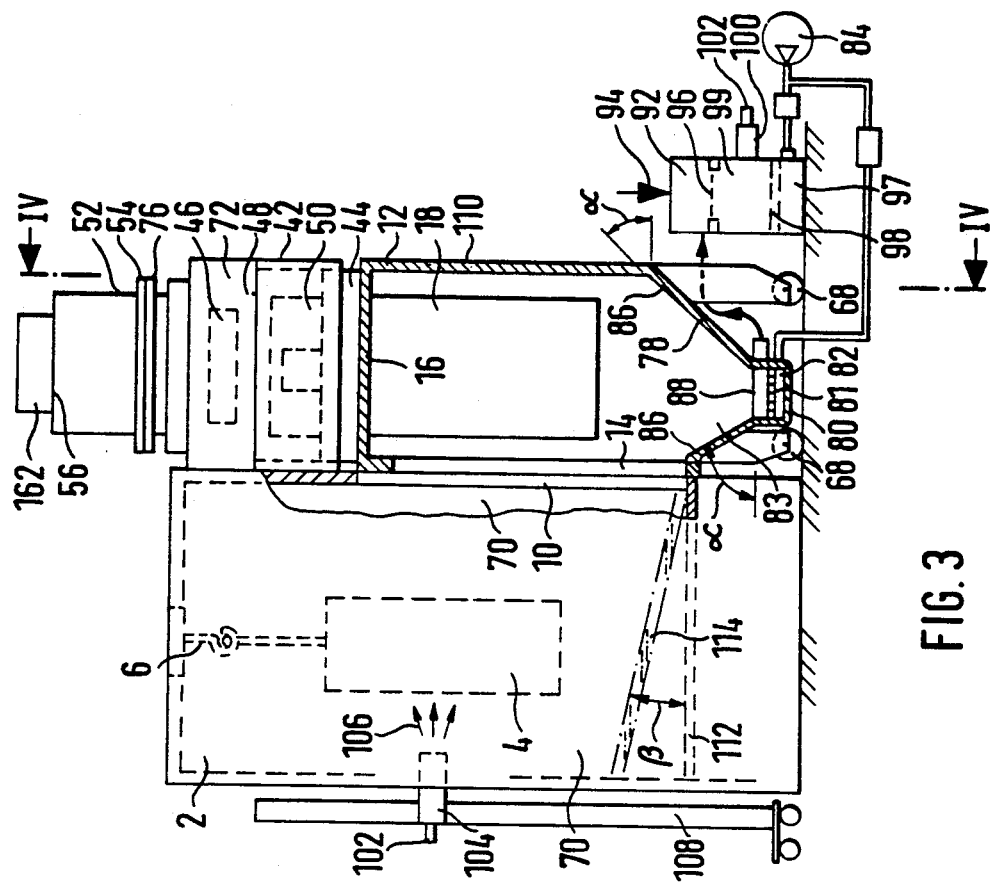
Figure 2:
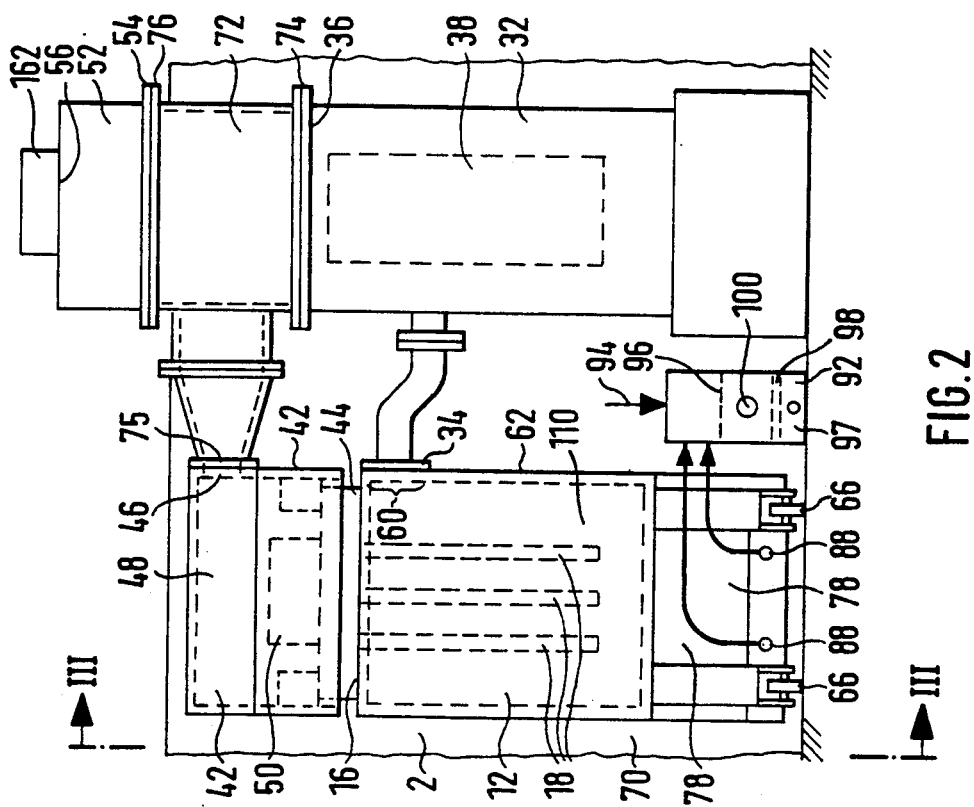
Figure 4:
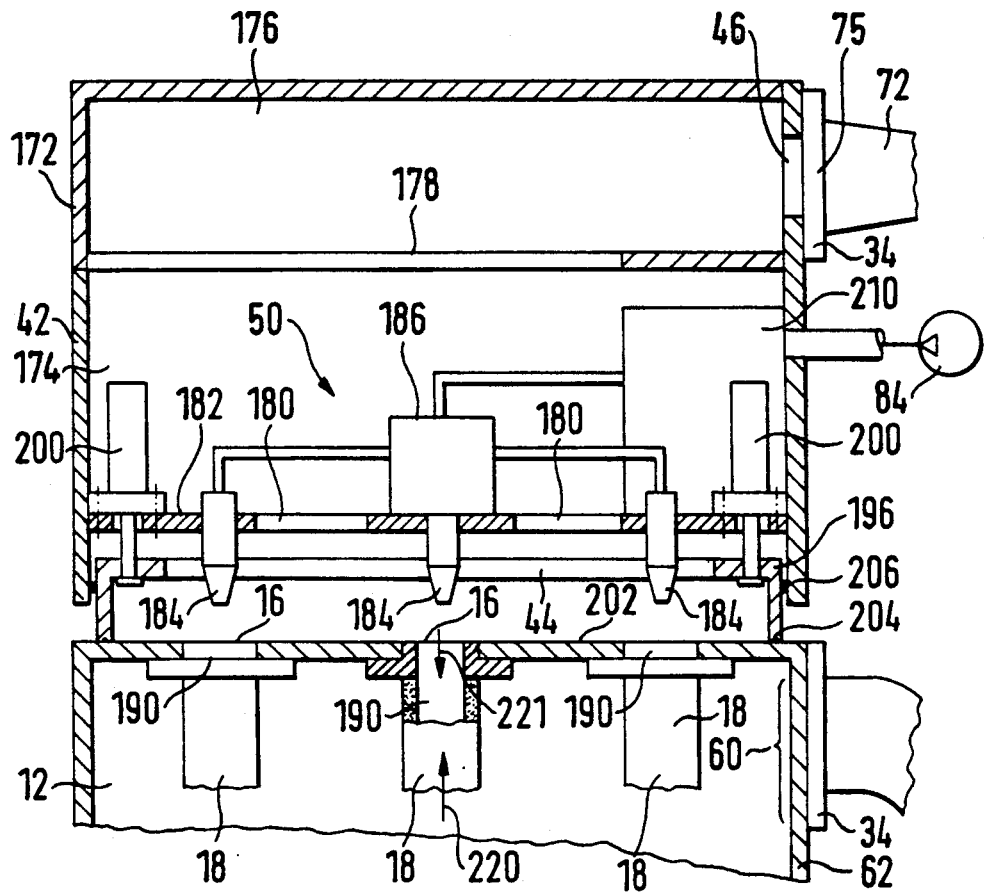
Figure 5:
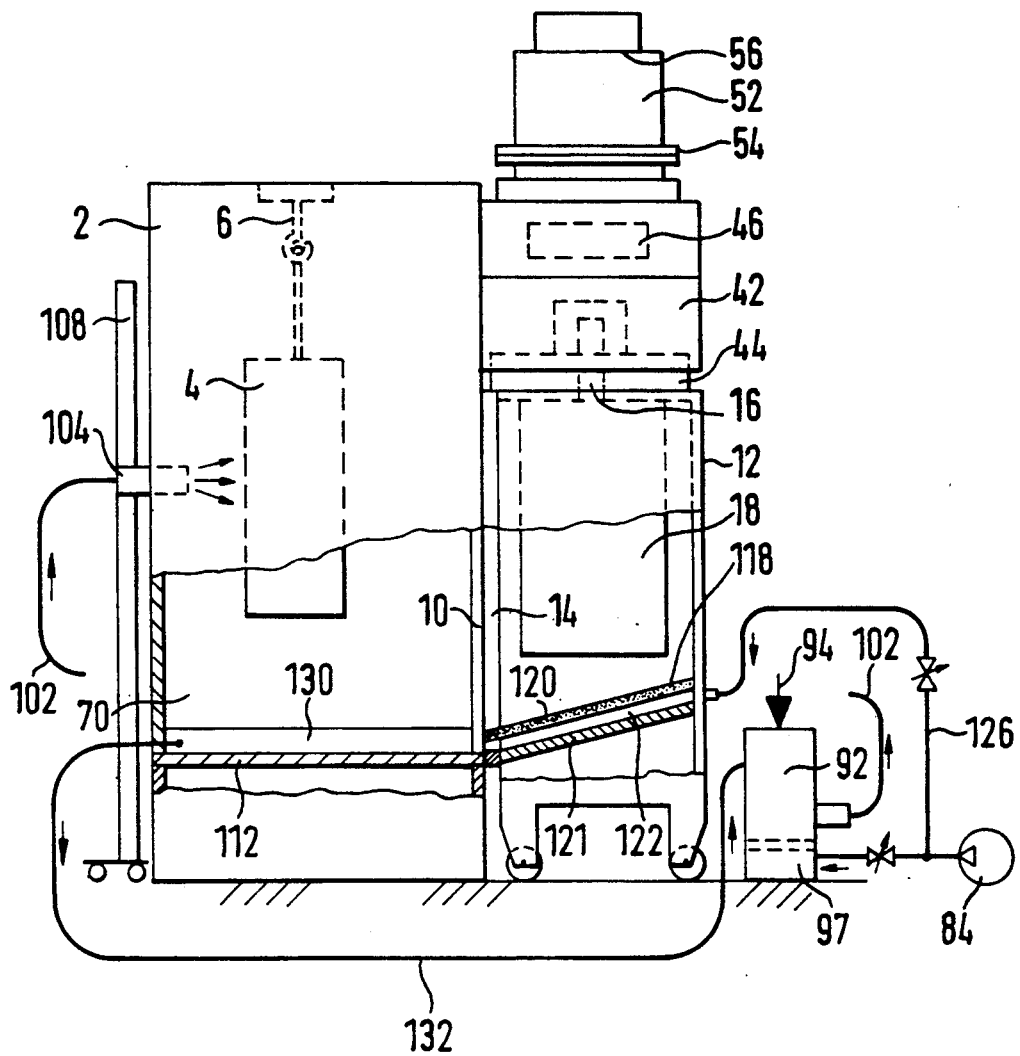
Figure 8:
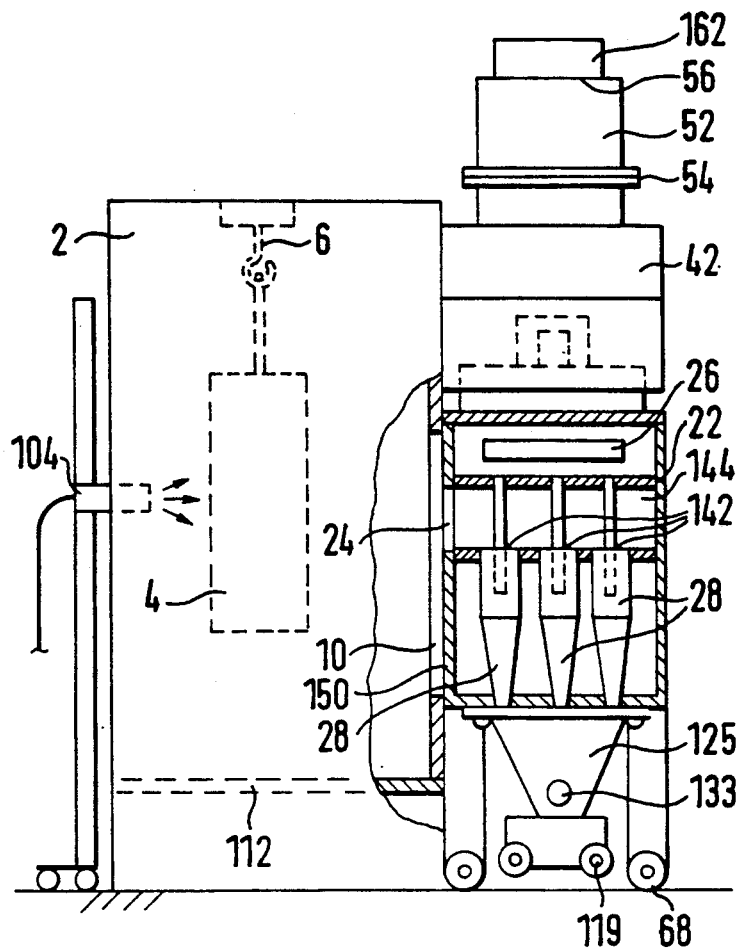
Figure 9:
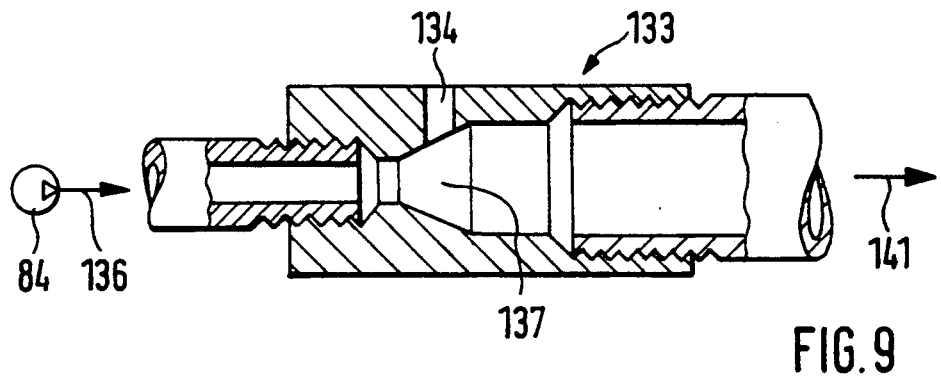
Figure 10:
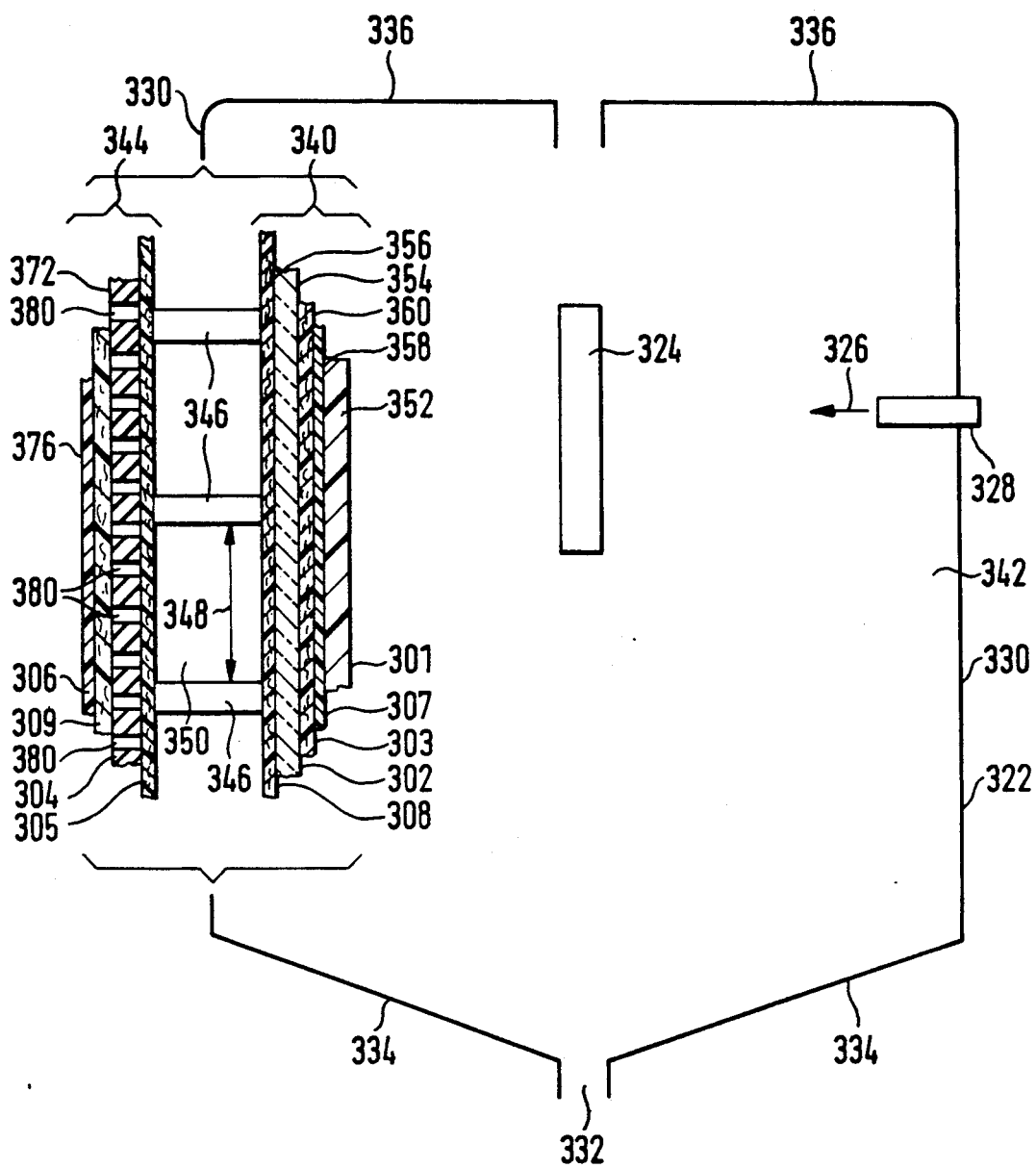

The invention is described in the following, referring to the drawing, and on the basis of preferred embodiments as examples. The drawing shows:

FIG. 1 a schematic top view of a powder spray coating system according to the invention, FIG. 2 a side view in the direction of the arrow II of FIG. 1, seen with a filter unit docked at the cabin, FIG. 3 a side view along the plane III—III of FIG. 2, FIG. 4 a side view broken off at the bottom, along the plane IV—IV of FIG. 3, FIG. 5 a side view, similar to FIG. 2, of a further embodiment of a cabin and a filter unit of the power spray coating system according to the invention, FIG. 6 a side view in the direction of the arrow II of FIG. 1, seen with a cyclone unit docked at the cabin, FIG. 7 a side view along the plane VII—VII of FIG. 6, FIG. 8 a side view, similar to FIG. 7, of a further embodiment of a cyclone unit of the power spray coating system according to the invention, FIG. 9 a longitudinal cross-section through a powder pump in the form of an injector, which functions according to the Venturi principle, FIG. 10 a schematic cross-section through a preferred embodiment of a cabin according to the invention.

The powder spray coating system according to the invention shown in FIG. 1-9 contains the following characteristics: a cabin 2, through which objects 4 which are coated with powder in the cabin are transported by a transport device, e.g. in the form of a transport chain 6, in or counter to the direction of an arrow 8, and which has a powder/air exhaust opening 10 on one cabin side; a mobile first filter unit 12, which has a flow inlet 14 and a flow outlet 16 and at least one filter element 18 for powder in the flow path between them; a mobile cyclone unit 22, which has a flow inlet 24 and a flow outlet 26 and a plurality of small cyclones 28 through which parallel flow occurs, for separation of powder, in the flow path between them; a post-filter unit 32 arranged close to the cabin 2 next to it, which has a flow inlet 34 and a flow outlet 36 and at least one filter element 38 for post-filtering the powder/air stream pre-filtered by the cyclone unit 22, in the flow path between them; a compressed air cleaning unit 42 arranged on the cabin 2, next to the post-filter unit 32, above the exhaust opening 10 on the outside of the cabin, which has a flow path 48 with a flow inlet 44 and a flow outlet 46 and a device 50 for occasional generation of compressed air bursts, which it blows into the filter elements 18 of the first filter unit 12, to clean these filter elements 18; a fan 52, the suction intake 54 of which is arranged close to the flow outlet 36 of the post-filter unit 32 and close to the flow outlet 46 of the compressed air cleaning unit 42 and is connected with both outlets 36, 46 simultaneously, in terms of flow; a part 60, preferably the outside surface of a side wall 62, of the first filter unit 12 forms a closure element to close the flow inlet 34 of the post-filter unit 32; a part 63, preferably the surface of a ceiling place 64, of the cyclone unit 22 forms a closure element to close the flow inlet 44 of the compressed air cleaning unit 42; the first filter unit 12 and the cyclone unit 22 can alternatively be moved under the compressed air cleaning unit 42 on wheels 66 or 68, respectively, to bring them into an operating position in which the flow inlet 14 of the first filter unit 12 or the flow inlet 24 of the cyclone unit 22 is adjacent to the exhaust opening 10 of the cabin 2, and is connected with the interior 70 via the exhaust opening 10, in terms of flow, where FIG. 1, 2, 3 and 5 show the first filter unit 12 in the operating position and the cyclone unit 22 in a ready position, while FIG. 6, 7 and 8 show the cyclone unit 22 in the operating position; the flow inlet 44 of the compressed air cleaning unit 42 and the flow inlet 34 of the post-filter unit 32 are fixed in place in such a way that only if a) the first filter unit 12 was brought into the operating position will its flow outlet 16 align with the flow inlet 44 of the compressed air cleaning unit and only then can these be connected, and at the same time, its closure element 60 aligns with the flow inlet 34 of the post-filter unit 32 and can close this flow inlet, b) the cyclone unit 22 was brought into the operating position will its flow outlet 26 align with the flow inlet 34 of the post-filter unit 32 and only then can these be connected, and at the same time, its closure element 63 aligns with the flow inlet 44 of the compressed air cleaning unit 42 and can close this flow inlet, while the first filter unit 12 and the cyclone unit 22, when they are moved away from the operating position, at the same time are also moved away from the flow inlets 34 and 44 of the post-filter unit 32 and the compressed air cleaning unit 42, which are fixed in place.

Preferably, the fan 52, in accordance with the drawings, is arranged at a distance above the post-filter unit 32 and is connected with this mechanically and in terms of flow via an intermediate piece 72, in such a way that it can be released. The intermediate piece 72 is a hollow box which has a flow inlet 74 facing downwards on its bottom, which is connected to the flow outlet 36 of the post-filter unit 32, which faces upwards, mechanically and in terms of flow, and a flow inlet 75 facing to the side, on one lateral side, which is connected with the flow outlet 46 of the compressed air cleaning unit 42 which faces to the side in the opposite direction, mechanically and in terms of flow, and a flow outlet 76 pointing upwards on its top, which is connected with a suction intake 54 of the fan 52 facing downwards, mechanically and in terms of flow.

The first filter unit 12 has a first catch container 78 arranged below its filter elements 18, which catches powder that drops from the filter elements 18. A chamber 82 is formed between the bottom 80 and a porous or perforated intermediate bottom 81 which is permeable for air. Compressed air flows from a compressed air source 84 into the chamber 82, and from there through the intermediate bottom 81 into the part 83 of the catch container 78 located above it. The first catch container 78 has a shape which narrows towards the bottom, in wedge shape or funnel shape. The side walls 86 of the first catch container 78 have a smooth surface and an angle of inclination $\alpha$ of more than 45°, so that powder slides off them, down to the intermediate bottom 81. Compressed air rising upwards from the intermediate bottom 81 mixes with the powder and forms a powder-/air mixture with it, which is capable of flow. This is referred to as fluidization of the powder. A powder pump 88 draws in powder, which was fluidized directly above the intermediate bottom 81 from the first catch container 78 and conveys it into a powder container 92, to which fresh powder 94 is also fed. The recycled powder from the first catch container 78 and the fresh powder 94 fall through a vibrating screen 96 in the powder container 92, and are fluidized again in the powder container 92. Fluidization takes place by means of air, which flows from the compressed air source 84 into a bottom container chamber 97 and from there via an air-permeable, porous or perforated intermediate bottom 98 into the container part 99 located between the intermediate bottom 98 and the screen 96. This fluidized powder is drawn from the container 92 by a powder pump 100, and pneumatically fed to at least one spray device 104 via a flow line 102. The spray device 104 sprays the powder 106 onto the objects 4 to be coated. The spray devices 104 are carried by a lift stand 108 and automatically positioned relative to the objects 4 to be coated. The lift stand 108 can be moved perpendicular and parallel to the cabin 2.

In a modified embodiment, the powder container 92 can be left out and the fluidized powder can be fed to the spray device 104 directly from the first catch container 78, by its powder pump 88. In this case, the fresh powder 94 is put into the first catch container 78.

Instead of a powder pump 88, the first catch container 78 can also have several powder pumps 88 in accordance with FIG. 2. In the embodiment shown in FIG. 2 and 3, the catch container 78 is permanently connected with the housing 110 of the first filter unit 12. In a modified embodiment, it is also possible to structure the first catch container 78 as a mobile carriage separate from the housing 110, which can be attached to the housing 110 so that it can be released.

The bottom 112 of the cabin 2 can be horizontal and level, as according to FIG. 3. Any excess powder which falls onto it must be removed, either at intervals or preferably continuously. This excess powder can be conveyed, manually or automatically, to the first catch container 78 of the first filter unit 12, perpendicular to the cabin. However, the powder can also be removed from the cabin interior 70 at the cabin floor 112 in the longitudinal cabin direction. For this purpose, a scraper can be used, or the cabin floor 112 can be structured, in known manner, as a moving filter strip, which conveys powder out of the cabin to a powder suction nozzle. FIG. 3 shows, with dot-dash lines, a modified embodiment with a cabin floor 114, which has an angle of inclination $\beta$ of at least 6° and through which compressed air flows from the bottom to the top, so that any powder which falls onto it is conveyed perpendicular to the longitudinal cabin direction, into the first catch container 78, by this compressed air. FIG. 5 shows a modified embodiment, in which the first filter unit 12 does not have a catch container below the filter elements 18, but rather a catch bottom 118 which conveys powder that drops from the filter elements 18 back into the interior 70 of the cabin 2. For this purpose, the catch bottom can have an inclination of at least 6° and be formed by an air-permeable perforated intermediate bottom 120, a floor element 121 arranged at a distance below it, and a compressed air chamber 122 located between them. The compressed air source 84 is connected with this compressed air chamber 122, in terms of flow, via a flow line 126. In the interior 70 of the cabin 2, powder which drops from the spray device 104 and which is conveyed into the cabin interior 70 by the catch bottom 118 reaches the cabin floor 112, from which it is conveyed into the powder container 92 via a flow line 132, by means of a powder conveyor device 130 (ductor and powder pump; continuous moving filter screen with powder suction nozzle; or catch funnel with powder pump). The catch bottom 118 of the first filter unit 12 can also be structured in different manner, so that powder is conveyed from it into the cabin 2. For example, a ductor could be arranged on the catch bottom 118, which pushes powder from the catch bottom 118 into the cabin 2. Another embodiment could consist of the fact that the catch bottom has such a large inclination that the powder on it slides into the cabin 2 due to gravity.

FIG. 1 shows the movement path and the movement direction 8 of the objects 4 to be coated, by means of the conveyor device 6. The filter elements 18 of the first filter unit 12 are located next to this movement path, approximately at the same height as the objects 4 to be coated. The filter elements 18 can have the shape of long candles or another shape. Pursuant to the preferred embodiment shown, the filter elements 18 of the first filter unit 12 have the shape of plates. The filter elements 18 are preferably arranged in such a way that the plate plane of the filter elements 18 is at a right angle to the flow inlet 14 of the first filter unit 12 and therefore also at a right angle to the movement path of the objects 4 to be coated, when the first filter unit 12 is standing in the operating position as shown in FIG. 1, 2 and 3. The plate-shaped filter elements 18 essentially have a height corresponding to the height of the objects 4 to be coated, and are also arranged at approximately the same height as these objects. The exhaust opening 10 of the cabin 2 and/or the flow inlet 14 of the first filter unit 12, as shown in FIG. 3, can either extend essentially over the entire height of the objects 4 to be coated and the filter elements 18, or only above or only below or only in their center region.

FIG. 1, 2 and 3 as well as 5 show the first filter unit 12 in its operating position, in which it is connected with the cabin 2, in terms of flow, via the exhaust opening 10 and the flow inlet 14, while the cyclone unit 22 is somewhere in a position away from the exhaust opening 10. In contrast, FIG. 6, 7 and 8 show the cyclone unit 22 in the operating position, in which it and the cabin essentially rest against one another, and are connected with each other via the flow inlet 24 and the exhaust opening 10, in terms of flow.

Under the cyclones 28 of the cyclone unit 22, a catch container 125 which can move on wheels 119 is arranged, which can be suspended on a housing 127 of the cyclone unit 22 and connected to form a sealed flow, by means of quick-release closures 124. In this way, the catch container 125 of the cyclone unit 22 can also be separated from the housing of the unit and from the cabin 2. The mobile catch container 125 of the cyclone unit 22 is referred to as the second catch container 125 in the following, to differentiate it from the first catch container 78 of the first filter unit 12. The first catch container 78 of the first filter unit 12 could be structured as a mobile carriage, in similar manner. A special characteristic of the second catch container 125 of the cyclone unit 22 consists of the fact that powder can be pneumatically removed from it and pneumatically conveyed to the spray device 104, either directly or indirectly via a powder container 92. For this purpose, the second catch container 125 has a funnel shape which narrows towards the bottom, in such a way that powder separated downwards by the cyclones 28 is caught by the second catch container 125, and continuously drops to the container bottom 131 within it, and at least the bottom part of the second catch container 125 has such a small cross-section that the suction effect of a powder pump 133 arranged there extends over the entire cross-section of the catch container 125, and draws powder into a suction opening 134 over the entire cross-section. If the powder pump 133 does not feed the powder drawn out of the second catch container 125 directly to the spray device 104, but rather into the powder container 92, then a further mini-cyclone 138 can be arranged in the flow path 136 of the powder, which separates the powder from the air which conveys it, so that the powder falls into the powder container 92, but the conveying air does not get into the powder container 92. The powder container 92 for the cyclone unit 22 can be structured in the same manner as the powder container 92 for the first filter unit 12. The use of a plurality of small, so-called mini-cyclones 28 in the cyclone unit 22, instead of a single large cyclone, has the advantage of a smaller space requirement and a better powder separation effect, and the use of the specially structured second catch container 125 results in an additional simplification and reduction in cost of the design, since the second catch container 125 does not need any device for fluidizing the powder contained in it. The walls 139 of the second catch container 125 preferably have such a large inclination of more than 45° that powder does not adhere to them, but rather slides off them towards the bottom 131 of the catch container 125. The inside surfaces of the walls 139 are smooth, so that they offer the least possible friction resistance for the powder.

According to FIG. 7, the exhaust opening 10 of the cabin 2 can extend essentially over the entire height of the cyclone unit 22, from the bottom ends of the mini-cyclones 28 to the height of the flow outlet 26. The flow inlet 24 which lies opposite extends only over their bottom half of the height of the cyclones 28, and the exhaust opening 10 of the cabin 2 is covered by a screen 140 of the cyclone unit 22 above this flow inlet 24. In the cyclone unit 22, a connection channel 144 which connects the upper intake ends 142 of the cyclones 28 with each other is formed, which is connected, in terms of flow, with the flow inlet 24 of the cyclone unit, via a connection channel 148 formed between the screen or wall 140 and a partition 146.

FIG. 8 shows another embodiment of the invention, in which the flow inlet 24 of the cyclone unit 22 extends only over the cross-sectional height of the connection channel 144, which connects the upper ends 142 of the cyclones 28 with each other in terms of flow. The exhaust opening 10 of the cabin 2 is located at the height of the connection channel 144, as is the flow inlet 24, and therefore essentially at the center height or in the upper half of the height of the objects 4 to be coated. In this way, less excess powder drops to the cabin floor 112 in the cabin 2, since the air stream ejected by the spray device 104 flows essentially horizontally through the cabin 2, to the flow inlet 24 of the cyclone unit 22. The exhaust opening 10 of the cabin 2 can extend upward and downward beyond the flow inlet 24, but is covered by a wall 150 of the cyclone unit 22 above and below this flow inlet 24.

FIG. 9 shows a longitudinal cross-section through the powder pump 133 of the mobile catch container 125 of the cyclone unit 22. The other powder pumps 88 and 100 of FIG. 3 can be structured in the same manner. They function according to the Venturi principle. A conveyor gas stream flows from the compressed air source 84, in the direction of the arrow 136, through the feed pump 133, and there generates a partial vacuum in an expanded channel segment 137, by means of which powder is drawn into the powder pump 133 via the suction opening 134, and conveyed in accordance with an arrow 141 by the conveyor gas stream.

On the fan 52, there is a filter 162, which is connected to its flow outlet 56 and cleans the exhaust air of the fan 52 of powder residue. For this reason, such a filter 162 is also referred to as an absolute filter, since the air cleaned by it is "absolutely" free of powder and can therefore be blown out into the surrounding outside atmosphere.

FIG. 4 shows the compressed air cleaning unit 42 in greater detail. It consists essentially of a box-shaped housing 172 and the device 50 arranged in it for occasional generation of compressed air bursts. The box 172 is divided into a bottom chamber 174 and a cross-channel 176 which extends over it. They are connected, in terms of flow, by a large passage opening 178. At one end of the cross-channel 176, there is the flow outlet 46 of the cleaning unit 42, facing towards the side. In the bottom 182, large passage openings 180 are formed, so that air from the flow inlet 44 located underneath can flow through the passage openings 180, the bottom chamber 174, the passage opening 178 and the cross-channel 176, to the flow outlet 46. In the bottom 182, a plurality of nozzles 184 of the device 50 is attached, which are supplied with compressed air by a valve device 186, manually or automatically controlled, whenever the filter elements 18 of the first filter unit 12 are supposed to be cleaned of powder by bursts of compressed air. In the representation in FIG. 4, it is assumed that the first filter unit 12 is in the operating position. In this position, the nozzles 184 are directed into the filter outlet openings 190, which together form the flow outlet of the filter unit. During normal operation, air flows from the cabin 2 into the first filter unit 12, through the filter elements 18, from their outlet openings 190 through the passage openings 180 in the bottom 182 of the compressed air cleaning unit 42, to the cross-channel 176 of the latter and from there through the flow outlet 46 and the intermediate piece 72 to the fan 52. So that the first filter unit 12 can be moved into place or away under the compressed air cleaning unit 42 in simple manner, but so that no air can escape between these two units in the operating position, a frame 196 is inserted in the lower segment of the housing 172, correspondingly adapted to the cross-sectional shape of the box and extending over its inside circumference, which can be lowered onto the top ceiling surface 202 of the first filter unit 12 by means of compressed air elements 200 which are attached to the housing 172. The frame 196 then forms a seal between itself and the top ceiling surface 202. The sealing effect of the frame 196 can be improved by additional seals 204 between the frame 196 and the top ceiling surface 202, and by seals 206 between the frame 196 and the housing 172. The frame 196 is hollow on the inside and thus forms the flow inlet 44 of the cleaning unit 42. The frame 196 is lifted by the compressed air elements 200, automatically or manually, when the first filter unit 12 is brought into the operating position shown in FIG. 1, 2 and 4 or removed from it. In the operating position shown, the flow center inlet 34 of the post-filter unit 32 rests against the part 60 of the wall 62, sealed in terms of flow, thereby forming a closure element for this flow inlet 34. The valve device 186 receives compressed air from a tank 210, Which is connected with the compressed air source 84. The valve device 186 can optionally feed bursts of compressed air to all the nozzles 184 at the same time, or consecutively to groups consisting of several nozzles 184. In this way, consecutive cleaning of the filter elements 18 is possible, while the filter elements 18 on which the compressed air bursts are not acting continue to remain effective as filters. The air flowing from the cabin 2 through the filter unit 12 to the flow outlet 46 of the cleaning unit 42 flows through the filter elements 18 in the direction of the arrow 220, while the compressed air bursts given off by the nozzles 184 flow through the filter elements 18 in the opposite direction 221.

When the first filter unit 12 is removed in FIG. 4, the frame 196 is first lifted up from the filter unit 12. Then the cyclone unit 22 can be moved in under the compressed air cleaning unit 42. When the cyclone unit 22 is in the operating position according to FIG. 6 and 7, and therefore located under the compressed air cleaning unit 42 instead of the first filter unit 12 in FIG. 4, the frame 196 is also lowered onto the top ceiling surface 63 of the cyclone unit 22 and pressed on to form a seal, so that the fan 52 cannot draw in any air between the ceiling surface 63 of the cyclone unit 22 and the cleaning unit 42. The top ceiling surface 63 of the cyclone unit 22 is completely closed, so that no air can get into the compressed air cleaning unit 42 from the cyclone unit 22, either.

In this operating position of the cyclone unit 22, its flow outlet 26 is connected with the flow inlet 34 of the post-filter 32. In this way, as is evident from FIG. 6 and 7, the fan 52 can draw air from the cabin 2. This air flows from the cabin 2 through its exhaust opening 10, the flow inlet 24 of the cyclone unit 22, the cyclone connection channel 144, into the top cyclone ends 142, through the top part of the cyclones 28 downwards, within the cyclones 28 into a suction pipe 226 arranged centrally within them, through the flow outlet 26 of the cyclone unit 22, the flow inlet 34 of the post-filter 32, through its filter elements 38, the intermediate piece 72, the fan 52 and the post-filter 162. In this way, the fan 52 and the post-filter 162 are used both for the cyclone unit 22, and, if the first filter unit 12 is in the operating position, for this first filter unit 12. In the top segment of the small mini-cyclones 28, there are guide blades 230, which bring the mixed powder/air stream flowing from top to bottom into a rotational movement, by means of which powder particles are separated from the mixed stream and fall through the cyclones 28, down into the catch container 125.

According to FIG. 1, a similar or different cabin 2/2 can be arranged after or in front of the cabin 2 in the direction of movement 8 of the transport device 6. At this additional cabin 2/2, a first filter unit 12 or a cyclone unit 22 can again be alternately brought into an operating position and the first filter unit 12 can be connected, in terms of flow, with a fan 52, via a compressed air cleaning device 42, or the cyclone unit 22 can be connected, in terms of flow, with the same fan 52, via the post-filter unit 32. The two cabins 2 and 2/2 can be arranged at a 180° rotation relative to each other, as shown by dot-dash lines in FIG. 1.

In the case of major units of the device, which can each be standardized individually as a separate module, and used for different purposes, the reference number is underlined in the drawings.

A particularly advantageous embodiment of the powder spray coating device according to the invention is obtained if the cabin 322 pursuant to FIG. 10, described below, is used. This cabin contains the following characteristics:

- the cabin walls 330 are structured as electrical insulators and consist, in sandwich construction, of several layers 301 to 309, of which at least one layer consists of plastic, preferably fiber-reinforced plastic;
- the cabin walls 330 are double-walled and have an inner wall 340, which delimits the spray space 342 of the cabin 322, and an outer wall 344;
- the inner wall 340 and the outer wall 344 form a cavity 350 between them, and are connected with each other by spacer elements 346 of electrically insulating material; both walls 340, 344 consist of several layers which adhere to each other 301 to 309;
- the inner wall 340 contains at least one first layer 301 of plastic, which forms the smooth surface 352 of the inner wall 340 towards the cabin interior, and delimits the spray space 342, a second layer 302 in the form of a sheet of ceramic material or a composition which predominantly contains ceramic material, and a third layer 303 of plastic, preferably fiber-reinforced plastic, which is located between the first layer 301 and the second layer 302 and adheres to the surface 354 of the second layer 302 which faces the spray space 342;
- the outer wall 344 contains at least a fourth layer 304 of electrically insulating material as the carrier element for a layer 305 of plastic, preferably fiber-reinforced plastic, arranged on its side which faces towards the spray space 342, and adhering to it there, and for a sixth layer 306 of electrically insulating material, which is arranged on the side 372 of the fourth layer 304 facing away from the spray space, and forms a smooth surface 376 of the cabin 322 on the outside of the cabin.

With this, the following advantages are achieved: The cabin offers great reliability against electrical arcing, no powder particles can collect at the inner surfaces which form the spray space of the cabin, and the cabin can be cleaned quickly and produced inexpensively.

In the following, additional advantageous embodiments of the cabin are described.

Second embodiment: The first layer 301 is a sheet of polypropylene with low flammability.

Third embodiment: The first layer 301 is a sheet of polyvinyl chloride plastic.

Fourth embodiment: The sixth layer 306, which forms the smooth surface 376 on the outside of the cabin, consists of a thixotropic resin, which can cure with exclusion of air (so-called Gel Coat).

Fifth embodiment: The first layer 301 and the third layer 303 of the inner wall 340 are glued together by a seventh layer 307 of electrically insulating material, which preferably consists of the same material (preferably Gel Coat) as the outer sixth layer 306 of the outer wall 344.

Sixth embodiment: An eighth layer 308 of plastic, preferably fiber-reinforced plastic, is arranged on the surface 356 of the second layer 302 which faces away from the spray space 342 and adheres to it.

Seventh embodiment: The fourth layer 304 of the outer wall 344 consists of a honeycomb-like or grid-like element of electrically insulating material, provided with a plurality of channels 380.

Eighth embodiment: The fourth layer 304 of the outer wall 344 is a sheet which consists of ceramic material or a composition consisting mainly of ceramic material.

Ninth embodiment: The fourth layer 304 of the outer wall 344 consists of the same material and has the same thickness as the second layer 302 of the inner wall 340.

Tenth embodiment: A ninth layer 309 of plastic, preferably fiber-reinforced plastic, is arranged between the fourth layer 304 and the sixth layer 306 of the outer wall 344 and adheres to both layers 304, 306.

Eleventh embodiment: The spacer elements 346 consist of polyurethane or PVC plastic, preferably are foamed, and adhere to the inner wall 340 and the outer wall 344, and form a rigid double wall in doing so.

Twelfth embodiment: The cabin ceiling 336 is structured in the same way as the cabin walls 330.

Thirteenth embodiment: The cabin floor 334 is structured in the same way as the cabin walls 330.

The spacer elements 346 are arranged at a distance 348 from one another. The objects 324 to be coated are coated with powder 326 in the cabin 322 by a spray device 328. At the lowest point of the inclined cabin floor 334, there is a drain channel 332 for powder that has fallen down.

We claim:

1. Powder spray coating system with the following characteristics:
    - a cabin (2, 2/2), through which objects 4 which are coated with powder in the cabin are transported, and which has a powder/air exhaust opening (10) essentially opposite a spray device (104, 108);
    - a mobile first filter unit (12), which has a flow inlet (14) and a flow outlet (16) and at least one filter element (18) for powder in the flow path between them;
    - a mobile cyclone unit (22), which has a flow inlet (24) and a flow outlet (26) and a plurality of small cyclones (28) through which parallel flow occurs, for separation of powder, in the flow path between them;
    - a post-filter unit (32) arranged close to the cabin (2) next to it, which has a flow inlet (34) and a flow outlet (36) and at least one filter element (38) for post-filtering the powder/air stream pre-filtered by the cyclone unit (22), in the flow path between them;
    - a compressed air cleaning unit (42) arranged on the cabin (2, 2/2) above the exhaust opening (10) on the outside of the cabin, which has a flow path (48) with a flow inlet (44) and a flow outlet (46) and a device (50) for occasional generation of compressed air bursts, which it blows into the filter elements (18) of the first filter unit (12), counter to the flow direction of the flow path (48), (into these filter elements 18), to clean these filter elements (18);
    - a fan (52), the suction intake (54) of which is arranged close to the flow outlet (36) of the post-filter unit (32) and close to the flow outlet (46) of the compressed air cleaning unit (42) and is connected with both outlets (36, 46) simultaneously, in terms of flow;
    - a part (60) of the first filter unit (.12) forms a closure element to close the flow inlet (34) of the post-filter unit (32);
    - a part (63) of the cyclone unit (22) forms a closure element to close the flow inlet (44) of the compressed air cleaning unit (42);
    - the first filter unit (12) and the cyclone unit (22) can alternatively be moved under the compressed air cleaning unit (42) on wheels, to bring them into an operating position in which the flow inlet (14) of the first filter unit (12) or the flow inlet (24) of the cyclone unit (22) is adjacent to the exhaust opening (10) of the cabin (2, 2/2) and is connected with the interior (70) via the exhaust opening (10), in terms of flow;
    - the flow inlet (44) of the compressed air cleaning unit (42) and the flow inlet (34) of the post-filter unit (32) are fixed in place in such a way that only if
        a) the first filter unit (12) was brought into the operating position will its flow outlet (16) align with the flow inlet (44) of the compressed air cleaning unit (42) and only then can these be connected, and at the same time, its closure element (60) aligns with the flow inlet (34) of the post-filter unit (32) and can close this flow inlet,
        b) the cyclone unit (22) was brought into the operating position will its flow outlet (26) align with the flow inlet (34) of the post-filter unit (32) and only then can these be connected, and at the same time, its closure element (63) aligns with the flow inlet (44) of the compressed air cleaning unit (42) and can close this flow inlet,
    - while the first filter unit (12) and the cyclone unit (22), when they are moved away from the operating position, at the same time are also moved away from the flow inlet (34) of the post-filter unit (32) and the flow inlet (44) of the compressed air cleaning unit (42).

2. Powder spray coating system according to claim 1, characterized by the fact that the fan (52) is arranged at a distance above the post-filter unit (32) and is connected with this mechanically and in terms of flow via an intermediate piece (72), in such a way that it can be released, that the intermediate piece (72) is a hollow box which has a flow outlet (76) pointing upwards, which is connected with a suction intake (54) of the fan (52) facing downwards, which furthermore has a flow inlet (74) facing downwards on its bottom, which is connected to the flow outlet (36) of the post-filter unit (32), which faces upwards, and which has a flow inlet (75) facing to the side, on one lateral side, which is connected with the flow outlet (46) of the compressed air cleaning unit (2) [sic] which faces to the side in the opposite direction.

3. Powder spray coating system according to claim 1, characterized by the fact that the first filter unit (12) has a catch container (78) below its filter elements (18), which catches powder that drops from the filter elements (18), that the catch container (78) has a fluidization device (80, 81, 82) for fluidization of the powder contained in it, and that the powder is pneumatically passed to a spray device (104, 108) from the catch container (78), directly or via a powder container (92) which fluidizes the powder.

4. Powder spray coating system according to claim 1, characterized by the fact that the first filter unit (12) has a catch bottom (118) which conveys powder that drops from the filter elements (18) back into the cabin (2, 2/2) (FIG. 5).

5. Powder spray coating system according to claim 1, characterized by the fact that the filter elements (18) of the first filter unit (12) are plate-shaped and their plate plane is arranged at a right angle to the flow inlet (14) of the first filter unit (12) and therefore also at a right angle to the exhaust opening (10) of the cabin (2, 2/2) in the operating position, and at a right angle to the direction of movement of the objects (4) to be coated in the cabin.

6. Powder spray coating system according to claim 1, characterized by the fact that under the cyclones (28) of the cyclone unit (22), a catch container is arranged, into which the powder separated by the cyclones (28) drops, that the catch container has a container part with such a small cross-section that powder can be drawn out of it with a powder pump (133), without any necessity of fluidizing the powder in the catch container with a fluidization device.

7. Powder spray coating system according to claim 1, characterized by the fact that under the cyclones (28) of the cyclone unit (22), a funnel-shaped catch container (125) is arranged, to catch the powder separated by the cyclones (28), the cross-section of which is less at the bottom than at the top, that the walls (139) of the catch container (125) have such a great inclination of more than 45° that powder slides off them to the bottom of the catch container, that at least one powder pump (133) is arranged at the bottom end segment of the catch container (125), in order to draw powder out of it by suction, that the inner cross-section of the bottom end segment of the catch container (125) is so small that the powder pump (133) can generate a suction effect over the entire inner cross-section of the catch container which is sufficient for suction and can therefore draw off powder, without any necessity of a fluidization device for fluidizing the powder in the catch container (125).

8. Powder spray coating system according to claim 6, characterized by the fact that the powder from the catch container (125) is pneumatically conveyed into a powder container (92), which has a powder fluidization device (81, 82), to which fresh powder (94) can also be fed, and out of which a mixture of these two powders is pneumatically conveyed to the spray device (104, 108).

9. Powder spray coating system according to claim 8, characterized by the fact that the powder from the catch container (125) is conveyed into the powder container (92) via a cyclone (138).

10. Powder spray coating system according to claim 8, characterized by the fact that the powder container (92) is provided with a screen arrangement (96) for treatment of the powder.

11. Powder spray coating system according to claim 1, characterized by the fact that the bottom (118) of the first filter unit (12) and/or the bottom of the cyclone unit (22) is structured in such a way that it conveys powder into the cabin (2, 2/2) in the operating position.

12. Powder spray coating system according to claim 1, characterized by the fact that the catch container (125) is attached to the cyclone unit (22) so that it can be released, and is structured as a mobile carriage, separate from the cyclone unit.

13. Powder spray coating system according to claim 1, characterized by the fact that the walls of the cabin (2, 2/2) consist of plastic at least on their surface which delimits the cabin interior (70).

14. Powder spray coating system according to claim 13, characterized by the fact that the cabin (322) for spray coating with electrostatically charged powder has the following characteristics:

1.1 the cabin walls (330) are double-walled and have an inner wall (340), which delimits the spray space (342) of the cabin (322), and an outer wall (344);

1.2 the inner wall (340) and the outer wall (344) form a cavity (350) between them, and are connected with each other by spacer elements (346) of electrically insulating material;

1.3 both walls (340, 344) consist of several layers which adhere to each other (301 to 309);

1.4 the inner wall (340) contains at least one first layer (301) of plastic, which forms the smooth surface (352) of the inner wall (340) towards the cabin interior, and delimits the spray space (342), a second layer (302) in the form of a sheet of ceramic material or a composition which predominantly contains ceramic material, and a third layer (303) of plastic, preferably fiber-reinforced plastic, which is located between the first layer (301) and the second layer (302) and adheres to the surface (354) of the second layer (302) which faces the spray space (342);

1.5 the outer wall (344) contains at least a fourth layer (304) of electrically insulating material as the carrier element for a layer (305) of plastic, preferably fiber-reinforced plastic, arranged on its side which faces towards the spray space (342), and adhering to it there, and for a sixth layer (306) of electrically insulating material, which is arranged on the side (372) of the fourth layer (304) facing away from the spray space, and forms a smooth surface (376) of the cabin (322) on the outside of the cabin.

* * * * *